United States Patent [19]

Heyne, III

[11] 3,845,369

[45] Oct. 29, 1974

[54] STARTING CONTROL FOR BRUSHLESS SYNCHRONOUS MOTORS

[75] Inventor: Carl J. Heyne, III, Allison Park, Pa.

[73] Assignee: Westinghouse Electric Corporation, Pittsburgh, Pa.

[22] Filed: May 10, 1973

[21] Appl. No.: 359,053

[52] U.S. Cl. ............... 318/174, 318/176, 318/181, 318/183, 318/193, 310/68 D
[51] Int. Cl. ............................................. H02p 1/46
[58] Field of Search .......... 310/68 D; 318/167, 174, 318/176, 181, 183, 193

[56] References Cited
UNITED STATES PATENTS
3,405,338   10/1966   Frola ............................. 318/193 X

*Primary Examiner*—G. Z. Rubinson
*Attorney, Agent, or Firm*—G. H. Telfer

[57] ABSTRACT

A starting control means for brushless synchronous motors in which a discharge resistor is provided in the form of a wire-wound coil mounted on a control wheel which also carries solid-state switching and control devices making up the starting control circuit, and which is designed to serve as a heat sink for the coil and other devices and also as a part of the electrical circuit.

10 Claims, 5 Drawing Figures

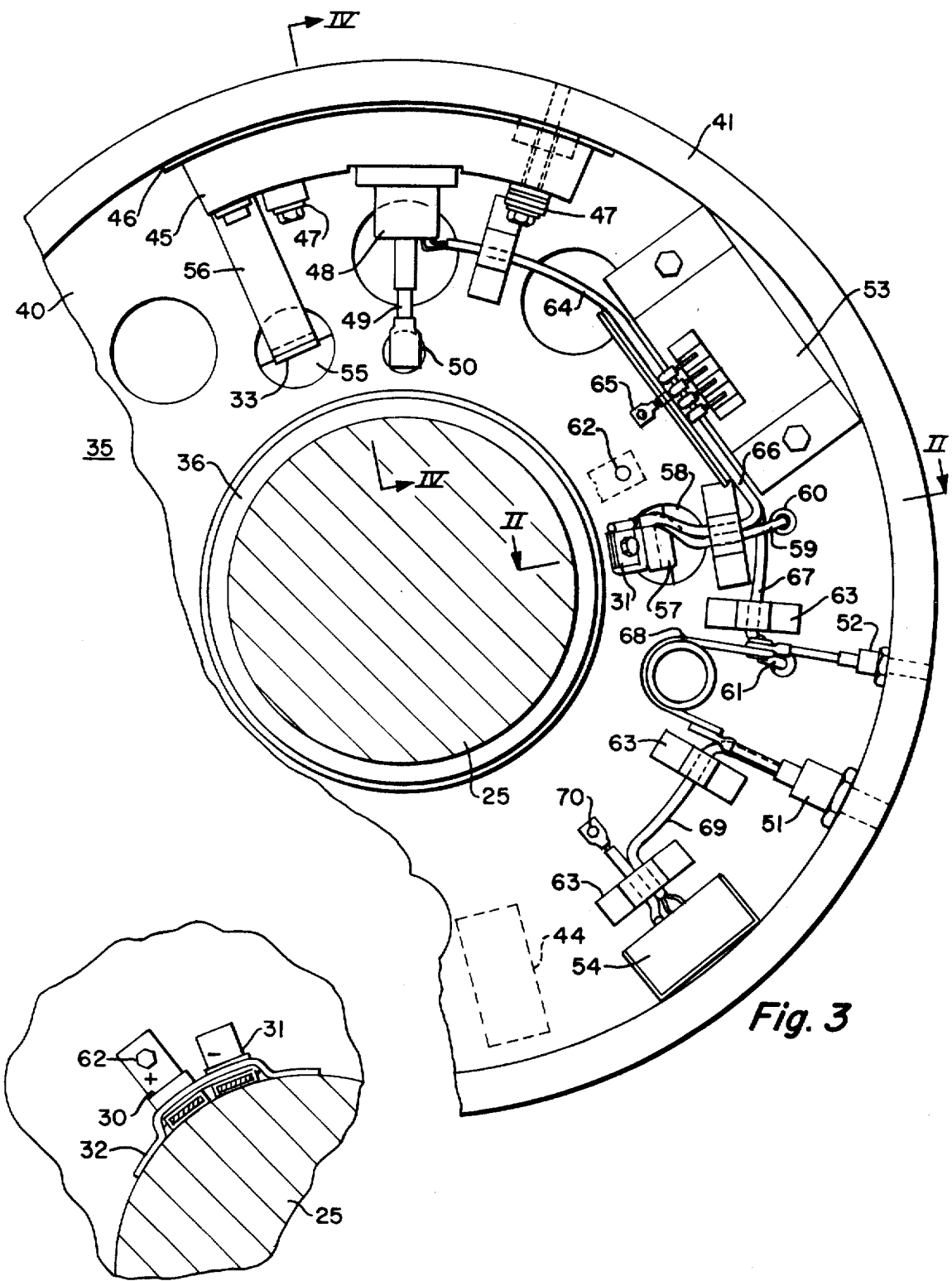

STARTING CONTROL FOR BRUSHLESS SYNCHRONOUS MOTORS

BACKGROUND OF THE INVENTION

The present invention relates to brushless synchronous motors, and more particularly to the construction and arrangement of the starting control means for such motors.

In a brushless synchronous motor, direct current excitation for the field winding is provided by an alternating current exciter having a rotating armature winding connected to a rectifier assembly which rotates with the exciter to supply the required direct current excitation to the motor field winding. Such a motor is normally started as an induction motor and the field winding is not excited during the starting period when the motor is operating at subsynchronous speed, a discharge resistor being connected across the field winding to limit the induced voltage. When the motor has accelerated to a speed sufficiently close to synchronism, direct current excitation is applied to the field winding at the proper time, the discharge resistor being disconnected, and the motor pulls into synchronism and runs normally.

In a brushless motor, the switching and control operations in the excitation system are necessarily performed by control means carried on the rotor. In the usual construction, a steel control wheel is mounted on the rotor shaft and solid-state switching and control components are mounted on the control wheel. Heat sinks for the switching and control devices are also mounted on the wheel and insulated from it, the wheel being used only for mechanical support. The discharge resistor is also mounted on the control wheel and in the usual practice, the discharge resistor has been made up of a number of resistance strip heaters mounted on the wheel. In order to obtain the desired resistance, it has been necessary to use a relatively large number of such heaters, as many as fifty being necessary in some cases. Obviously, this requires a large amount of space to provide the required support and adequate ventilation. The operation of this conventional construction has in general been satisfactory, but it results in a very large and heavy control wheel which sometimes leads to mechanical problems. The cost of manufacture of such a wheel and of assembling the necessary resistors and control components on it is also undesirably high.

SUMMARY OF THE INVENTION

In the improved construction and arrangement of the present invention, the discharge resistor is provided in the form of a wire-wound resistance coil and the control wheel is designed to provide a suitable mounting for such a coil, preferably in the form of a circumferential recess in which the coil can be placed. The coil may be form-wound and insulated and then mounted on the wheel as a unitary device, or the wheel may be designed in such a manner that the coil can be wound in place on the wheel and supported thereon in any desired manner. The wheel is made of a suitable material of good thermal and electrical conductivity, and the coil is mounted on the wheel so as to be in good heat transfer relation with it so that the wheel serves as a heat sink to aid in dissipating the heat generated in the coil. At least one of the solid-state switching devices utilized in the control circuitry is mounted directly on the wheel, so that the wheel also serves as a heat sink for the switching device, and the arrangement is such that the wheel itself serves as part of the electrical circuit thus permitting elimination of some of the connectors and insulators previously necessary. In this way, a relatively small control wheel can be utilized, as compared to the large and heavy steel wheels previously required, and improved performance and lower cost of manufacture and assembly are achieved.

BRIEF DESCRIPTION OF THE DRAWINGS

The invention will be more fully understood from the following detailed description, taken in connection with the accompanying drawings, in which:

FIG. 3 is a view in elevation of one side of the control wheel of FIG. 2;

FIG. 5 is a fragmentary view in elevation of the control wheel and field leads.

DESCRIPTION OF THE PREFERRED EMBODIMENT

Figure 1:
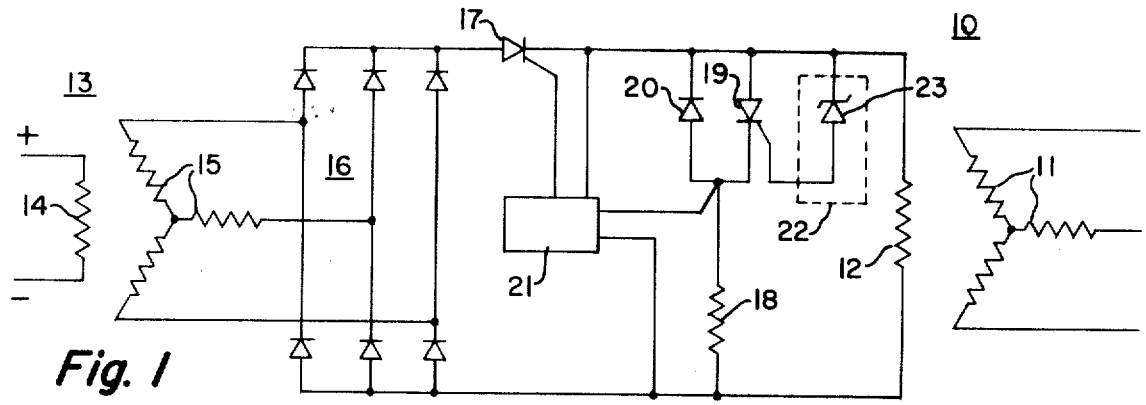
FIG. 1 is a schematic diagram showing a typical circuit for a brushless synchronous motor.

As previously indicated, the invention relates to the starting control and excitation system for a brushless synchronous motor. A typical circuit for such a motor is shown in FIG. 1. As there shown, a synchronous motor 10 may have a three-phase stator winding 11 supplied from any suitable alternating current source and a field winding 12 which is usually placed on a plurality of salient poles on the rotating field member. Field excitation for the motor is provided by an alternating current exciter 13 which has a field winding 14 on its stator excited with direct current from any suitable source. The exciter 13 has an armature winding 15, shown as a three-phase winding, carried on the rotor so as to be rotatable with the field winding of the motor. The armature winding 15 is connected to a rectifier bridge 16 to provide a direct current output for excitation of the field winding 12. The exciter armature winding 15, the rectifier 16 and the field winding 12 are all carried on the same shaft, or are otherwise rotatable together on a common rotating member.

The field winding excitation provided by the output of the rectifier 16 is controlled by a solid-state switch or thyristor 17 connected in series between the rectifier output and the field winding 12. During the starting period when the motor is operating at subsynchronous speed, a discharge resistor 18 must be connected across the field winding 12 in order to limit the high induced voltage in the field winding and to increase the starting torque by short-circuiting the field winding to provide additional induction motor torque. Connection of the discharge resistor 18 across the field winding 12 is controlled by a second thyristor 19 and a diode 20 connected with opposite polarity. Solid-state control circuits are provided for firing the thyristors 17 and 19. The thyristor 17 is fired to excite the field winding 12 with direct current at the proper time and phase angle and a control module 21 is provided for this purpose. Any suitable control circuit may be utilized in the control module 21 such as either of the excitation controls shown in Frola U.S. Pat. No. 3,405,338 or Hoffmann et al. U.S. Pat. No. 3,414,788. The control circuits shown in both of these patents respond to the frequency of the induced voltage in the field winding 12 and may be connected across the field winding or, as shown, across the discharge resistor 18. The thyristor 19 is fired by means of a control module 22 which, in the simplest form, may comprise a Zener diode 23 connected as shown to respond to the voltage of the field winding 12.

The operation of the motor circuit is as follows. When it is desired to start the motor, the stator winding 11 is energized and the motor will start by induction motor action resulting from the conventional damper bars on the field member, the thyristor 17 being in its non-conductive or blocking state at this time. A relatively high voltage of high slip frequency is induced in the field winding 12 during the starting period when the motor is running at subsynchronous speed, and this voltage is sufficient to breakdown the Zener diode 23 and fire the thyristor 19 to connect the discharge resistor 18 across the field winding 12, the diode 20 providing conduction on alternate half-cycles. The motor 10 accelerates until it approaches synchronous speed, the slip frequency correspondingly decreasing, and when the control circuit 21 senses the proper point as indicated by the slip frequency and phase angle of the induced voltage, the thyristor 17 is fired to apply direct current excitation from the rectifier 16 to the field winding 12. Since the induced voltage across the field winding drops to essentially zero as the motor reaches synchronism, the Zener diode 23 will become nonconductive and prevent firing of the thyristor 19 so that the discharge resistor 18 is disconnected from the field winding. The motor is then in its normal operating condition and will pull into step and run as a synchronous motor.

Figure 2:
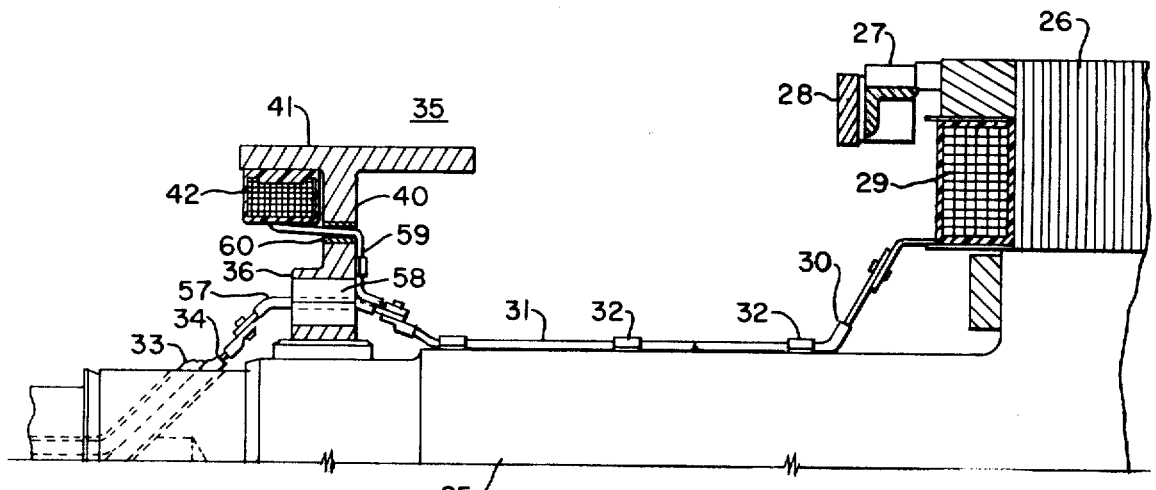
FIG. 2 is a longitudinal sectional view of a portion of the rotor assembly of a motor embodying the invention, the control wheel being shown in section substantially on the line II—II of FIG. 3.

The present invention provides an improved construction for the discharge resistor and control means of such a brushless synchronous motor. FIG. 2 shows a longitudinal sectional view of a portion of the rotor member of a motor embodying the invention. As there shown, the rotor includes a shaft 25 which carries a plurality of salient field poles 26 mounted in any usual or suitable manner, as on a spider portion of the shaft, for cooperation with a stator member (not shown) of any usual or suitable construction. Each of the pole pieces 26 is provided with the usual damper bars 27 carried in the pole face and connected by end rings 28 to complete the damper circuit. A field coil 29 is placed on each of the poles 26 and the field coils are connected together to form a field winding. Leads 30 and 31 are provided to connect the field winding to the excitation system and these leads extend along the shaft and are secured to it by means of cleats 32. It will be understood that an alternating current exciter and rotating rectifier assembly are also provided, as in FIG. 1, driven by shaft 25, but they have not been illustrated as they are not a part of the present invention. Leads 33 and 34 from the rectifier assembly are carried through the shaft 25 and brought out as shown for connection to the excitation circuit.

The control wheel 35 is made of any suitable material which has good thermal and electrical conductivity, such as aluminum. The wheel 35 has a hub portion 36 for mounting on the shaft 25 and is insulated from the shaft. Preferably, the hub portion of the wheel is secured to a bushing 37, as by shrinking it thereon, with a layer of insulation 38 between the hub and the bushing. The bushing 37 may then be pressed or otherwise secured in place on the shaft 25. The control wheel 35 has a generally radial flange portion 40 which forms a central partition and carries a rim portion 41 which preferably extends axially in both directions from the flange 40.

A discharge resistor 42 is carried on the wheel 35. The discharge resistor 42 is preferably made as an annular, multi-turn coil of wire extending circumferentially around the wheel and which has a sufficient number of turns wound in layers to provide the desired resistance. The coil may be made in any desired manner. In the preferred embodiment, the coil is wound on a form and encapsulated in suitable insulating material 43, and is then placed in position on the control wheel 35 and secured thereto by means of mounting lugs 44 embedded in the insulation of the coil and bolted to the flange 40. It will be noted that the axially-extending rim 41 forms a circumferential recess in which the coil 42 fits, and the coil 42 is thus disposed in good heat transfer relation to the aluminum wheel 35 so that the wheel serves as a heat sink for dissipating the heat generated in the coil 42.

It will be understood, of course, that the coil 42 may be made in other ways, such as by winding it directing in place on the wheel 35, and the circumferential recess in which it is positioned may be arranged to open radially instead of axially as shown, so that the coil could more readily be wound in it and then supported in position by circumferential banding. If desired, the coil might be wound merely on projections, or other suitable supports, on the wheel 35 and insulated and secured in position in any desired manner. In all cases, however, an annular, multi-turn, wire-wound coil 42 is provided which is disposed substantially coaxially with the wheel and mounted in such a manner that the wheel serves as a heat sink for the coil.

Figure 4:
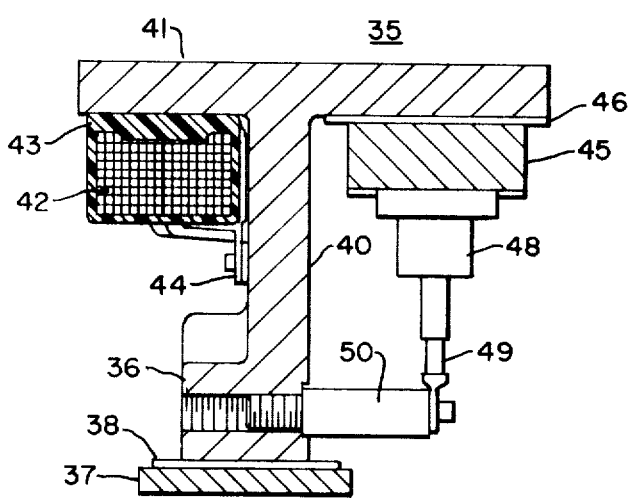
FIG. 4 is a sectional view of the control wheel substantially on the line IV—IV of FIG. 3.

The control and excitation circuit components are carried on the control wheel 35 on the opposite side of the flange 40 from the coil 42. As shown in FIG. 3, a heat sink 45 is mounted on the inner surface of the rim 41. The heat sink 45 may be a suitably shaped block of aluminum and is insulated from the rim by a layer of insulation 46 and secured to the rim by insulated bolts 47. A thyristor 48 is mounted on the heat sink 45 with its anode terminal in thermal and electrical contact therewith. The cathode terminal 49 of the thyristor 48 is attached to a conducting post 50 which is threaded into the flange 40 of the control wheel, as shown in FIG. 4, so that the thyristor 48 is connected directly to the conductive wheel. A second thyristor 51 and a diode 52, which correspond to the thyristor 19 and diode 20 of FIG. 1, are mounted directly on the rim 41 so as to be in both thermal and electrical contact therewith. In addition, a control module 53 and a gating module 54, corresponding respectively to the module 21 and the module 22 of FIG. 1, are mounted on the wheel by bolting to the flange and the rim, respectively, or in any other suitable manner.

The positive lead 33 from the exciter system passes through the flange 40 through an insulating bushing 55 (FIG. 3) and is connected to a radially-extending strap conductor 56 which is bolted or otherwise connected to the heat sink 45. The negative exciter lead 34 is attached, as shown in FIG. 2, to an axial lead 57 which extends through an insulating bushing 58 in the flange 40. One lead 59 from the coil 42 is attached to the other end of the lead 57, the lead 59 passing through flange 40 through an insulating tube 60. The other lead 61 (FIG. 3) of the coil 42 is similarly brought through the flange 40 through another insulating tube.

The excitation circuit for the field winding 12 can be seen in FIG. 3. The positive exciter lead 33, as previously described, is connected through conductor 56 to the heat sink 45 and through the thyristor 48 to the conductive wheel flange at 50. The positive lead 30 to the field winding is bolted to the wheel at 62 (FIG. 5) to complete the positive side of the circuit. The negative field winding lead 31 is connected to the negative exciter lead 34 by the conductor 57 which extends through the flange 40 as previously stated and to which the lead 31 is bolted.

The control circuitry can also be seen in FIG. 3, the various conductors being supported on the wheel in any suitable manner as by cleats 63. The gate of the thyristor 48 is connected to the control module 53 by a conductor 64 and the control module is connected to the wheel at 65 to complete the gating circuit. The control module 53 is also connected across the resistance coil 42 by conductors 66 and 67 which are directly attached to the resistance coil leads 59 and 61, respectively. The cathode of thyristor 51 and the anode of diode 52 are connected together by a lead 68 to which the lead 61 of coil 42 is also connected. The gate of the thyristor 51 is connected by a conductor 69 to the control module 54 which is also connected to the wheel at 70. It will be seen that the control circuitry is the same as that shown in FIG. 1 and its operation is the same as previously described.

It should now be apparent that an improved construction has been provided for the control wheel and starting control of a brushless synchronous motor. The new control wheel provides a mounting for a wire-wound resistance coil for use as a discharge resistor during starting, and also provides for mounting the necessary components of the control circuitry. The wheel is constructed so that it serves as a heat sink for dissipating heat from the resistance coil and also from some of the solid-state switch and control components carried on it. It also is used as a part of the excitation circuit which supplies the field current during operation and as a part of the control circuitry. In this way, the control wheel is utilized for a number of functions in addition to being merely a mechanical support as in previous constructions. This new design concept results in a support wheel of smaller size and lower weight than has previously been required, and also in a wheel which is easier and less expensive to manufacture and which involves simpler and less expensive operations in assembling the necessary components in place on the wheel.

A particular embodiment of the invention has been shown and described for the purpose of illustration, but it will be apparent that various other embodiments and modifications are possible and are within the scope of the invention.

What is claimed is:

1. A synchronous motor having a rotor member including a field member, a field winding on said field member, a source of direct current excitation for said field winding, a control wheel on the rotor member, an annular, multi-turn wire coil disposed on said control wheel substantially coaxial therewith, and solid-state control means carried on the control wheel and adapted to connect said coil across the field winding during starting of the motor and to disconnect the coil and apply said direct current excitation to the field winding for synchronous operation of the motor; said control means including solid-state switch devices and static circuit components interconnected in a control circuit, said control wheel being made of electrically conductive material of good thermal conductivity, and at least one of said solid-state switch devices being mounted directly on the wheel in good electrical and thermal contact therewith.

2. The combination defined in claim 1 in which said control wheel has a recess extending circumferentially thereof and said coil is disposed in said recess.

3. The combination defined in claim 2 in which the control wheel is made of material of good thermal conductivity and the coil is disposed in the recess in good thermal relation with the wheel.

4. The combination defined in claim 1 including a heat sink member mounted on said wheel and insulated therefrom, a solid-state switch device mounted on said heat sink, and means interconnecting said switch devices in a control circuit including the wheel as a part of the circuit.

5. In a synchronous motor, a rotor member having a field winding thereon, a source of direct current excitation on the rotor member, a control wheel on the rotor member, said control wheel having a radial flange portion, a multi-turn wire coil mounted on the control wheel on one side of said flange, a plurality of solid-state switching and control devices mounted on the control wheel on the other side of said flange, and means interconnecting said switching and control devices in a control circuit for connecting said coil across said field winding during starting of the motor and for disconnecting the coil and connecting said source of direct current excitation to the field winding for synchronous operation of the motor; said control wheel having an axially-extending rim forming a recess on said one side of the flange, said coil being mounted in said recess.

6. The combination defined in claim 5 in which the control wheel is made of a material of high thermal conductivity and the coil is mounted in good heat transfer relation to the wheel.

7. The combination defined in claim 5 in which said wheel is made of metal of good thermal and electrical conductivity, and said control circuit includes at least one solid-state switching device mounted directly on the wheel in thermal and electrical contact therewith, and said interconnecting means includes the wheel as part of the circuit.

8. The combination defined in claim 5 in which said wheel is made of metal of good thermal and electrical conductivity, a conductive heat sink mounted on the wheel and insulated therefrom, a first solid-state switching device mounted on said heat sink in conductive relation therewith, a second solid-state switching device mounted directly on the wheel in thermal and electrical contact therewith, and said means for interconnecting said switching devices includes the wheel as a part of the circuit.

9. The combination defined in claim 5 in which said wheel is made of metal of good thermal and electrical conductivity, said coil being mounted in said recess on said one side of the flange and in good heat transfer relation to the wheel, said rim extending axially in both directions from the flange, said switching and control devices being mounted on the wheel on the other side of the flange and including at least one switching device mounted directly on said rim in thermal and electrical contact therewith, said coil having leads extending through the flange, and means including the wheel for interconnecting said switching and control devices and said coil leads in said control circuit.

10. The combination defined in claim 9 and including a conductive heat sink mounted on the rim on said other side of the flange and insulated therefrom, a first solid-state switching device mounted on said heat sink in conductive relation therewith and having another terminal directly connected to the wheel, a second solid-state switching device mounted directly on the rim on said other side of the flange in thermal and electrical contact with the rim, said direct current source including two leads extending axially of the rotor member and passing through the flange, one of said leads being connected to said heat sink and the other of said leads being adapted for connection to one side of said field winding, and means for effecting connection of the other side of the field winding directly to the wheel.

* * * * *